US012578466B2

(12) United States Patent
Wang et al.

(10) Patent No.: US 12,578,466 B2
(45) Date of Patent: Mar. 17, 2026

(54) LINEAR ARRAY ULTRASONIC PROBE

(71) Applicant: SHENZHEN MINDRAY BIO-MEDICAL ELECTRONICS CO., LTD., Shenzhen (CN)

(72) Inventors: Jinchi Wang, Shenzhen (CN); Nan Chen, Shenzhen (CN); Fei Wu, Shenzhen (CN); Ming Tang, Shenzhen (CN); Xuedong Liu, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 1025 days.

(21) Appl. No.: 17/706,508

(22) Filed: Mar. 28, 2022

(65) Prior Publication Data

US 2023/0305146 A1    Sep. 28, 2023

(30) Foreign Application Priority Data

Mar. 24, 2022    (CN) .......................... 202210303621.1

(51) Int. Cl.
 *B06B 1/06* (2006.01)
 *G01N 29/24* (2006.01)
 *G01S 15/89* (2006.01)

(52) U.S. Cl.
 CPC .......... *G01S 15/8918* (2013.01); *B06B 1/064* (2013.01); *G01N 29/245* (2013.01)

(58) Field of Classification Search
 CPC .................................. B06B 1/06; B06B 1/064
 USPC .......................................... 310/322, 334, 335
 See application file for complete search history.

(56) References Cited

U.S. PATENT DOCUMENTS

| | | | |
|---|---|---|---|
| 8,803,404 B2 | 8/2014 | Kwon et al. | |
| 11,413,014 B2 | 8/2022 | Nakagawa et al. | |
| 2007/0205697 A1* | 9/2007 | Chaggares ........... | A61B 8/4444 |
| | | | 310/311 |
| 2010/0176688 A1* | 7/2010 | Jin ........................ | B06B 1/0644 |
| | | | 29/25.35 |
| 2015/0245815 A1 | 9/2015 | Wakabayashi | |
| 2016/0089111 A1* | 3/2016 | Yamada ............. | G01N 29/2437 |
| | | | 600/459 |

FOREIGN PATENT DOCUMENTS

| | | |
|---|---|---|
| CN | 102078222 A | 6/2011 |
| CN | 102297901 A | 12/2011 |
| CN | 104586430 A | 5/2015 |
| WO | 2021/042329 A1 | 3/2021 |

OTHER PUBLICATIONS

First Search dated Aug. 28, 2024, issued in related Chinese Patent Application No. 202210303621.1 (2 pages).

* cited by examiner

*Primary Examiner* — Derek J Rosenau
(74) *Attorney, Agent, or Firm* — Sheppard Mullin Richter & Hampton LLP

(57) ABSTRACT

Disclosed is a linear array ultrasonic probe, of which a first conductive layer is arranged on an outer wall of a backing body facing an array element layer by means of a gold spraying, electroplating, or chemical plating process, and/or a second conductive layer is arranged on a negative end by means of a gold spraying, electroplating, or chemical plating process, so that a thickness of at least one of the first conductive layer and the second conductive layer can be made thinner, for example, the thickness a≤5 micrometers.

20 Claims, 5 Drawing Sheets

LINEAR ARRAY ULTRASONIC PROBE

This application is based on and claims priority to and benefits of Chinese Patent Application No. 202210303621.1, filed on Mar. 24, 2022. The entire content of the above-identified application is incorporated herein by reference.

TECHNICAL FIELD

The disclosure relates to an ultrasound device, and in particular, to a linear array ultrasonic probe.

BACKGROUND

A linear array ultrasonic probe is a vital component of a diagnostic ultrasound imaging device and usually includes an acoustic lens, a matching layer, a grounding layer, a piezoelectric material (an array element layer), a circuit board, and a backing block. The working principle of the ultrasonic probe is to use the piezoelectric effect to convert an excitation electrical pulse signal of an ultrasound machine into an ultrasound signal that is to enter a patient's body, and then convert an ultrasonic echo signal reflected by a tissue into an electrical signal, thereby implementing an examination of the tissue.

In an actual product, a signal connecting circuit and grounding of an array element are usually connected by using an FPC or a metal foil. However, due to material properties of the FPC and the metal foil and an inability to make a thickness thereof thinner, an acoustic impedance mismatch is likely to occur between the piezoelectric material and the backing block, and between the piezoelectric material and the matching layer, thus affecting performance of the ultrasonic probe, especially, of high-frequency and ultra-high-frequency ultrasonic probes.

SUMMARY

The disclosure provides a linear array ultrasonic probe, to present a lead-out structure of a positive end and/or a negative end of an array element.

In one embodiment of the disclosure, a linear array ultrasonic probe is provided, which may include:

an array element layer having a number of array elements, one end of each of the array elements being a positive end and the other end thereof being a negative end;

a backing layer having a backing body, with the positive end of the array element arranged on the backing body;

a matching layer arranged on the negative end; and a circuit board having a positive electrode connection circuit and a negative electrode connection circuit, with the positive electrode connection circuit connected to the positive end, and the negative electrode connection circuit connected to the negative end; wherein a first conductive layer is provided on an outer wall of the backing body facing the array element layer, the positive end of the array element is arranged on the first conductive layer, and the positive electrode connection circuit is connected to the positive end via the first conductive layer; and/or a second conductive layer is provided on the negative end of the array element, and the negative electrode connection circuit is connected to the negative end via the second conductive layer;

a thickness a of the first conductive layer is: a≤5 micrometers, and/or a thickness b of the second conductive layer is: b≤5 micrometers; and the first conductive layer is arranged on the outer wall of the backing body facing the array element layer by means of a gold spraying, electroplating, or chemical plating process;

and/or the second conductive layer is arranged on the negative end by means of a gold spraying, electroplating, or chemical plating process.

One embodiment of the disclosure provides a linear array ultrasonic probe, including:

an array element layer having a number of array elements, one end of each of the array elements being a positive end and the other end thereof being a negative end;

a backing layer having a backing body, with the positive end of the array element arranged on the backing body;

a matching layer arranged on the negative end; and a circuit board having a positive electrode connection circuit and a negative electrode connection circuit, with the positive electrode connection circuit connected to the positive end, and the negative electrode connection circuit connected to the negative end; wherein a first conductive layer is provided on an outer wall of the backing body facing the array element layer, the positive end of the array element is arranged on the first conductive layer, and the positive electrode connection circuit is connected to the positive end via the first conductive layer; and/or a second conductive layer is provided on the negative end of the array element, and the negative electrode connection circuit is connected to the negative end via the second conductive layer;

the first conductive layer is attached to the outer wall of the backing body facing the array element layer, so as to be integral with the outer wall of the backing body; and/or the second conductive layer is attached to the negative end, so as to be integral with the negative end; and wherein the first conductive layer is arranged on the outer wall of the backing body facing the array element layer by means of a gold spraying, electroplating, or chemical plating process;

and/or the second conductive layer is arranged on the negative end by means of a gold spraying, electroplating, or chemical plating process.

One embodiment of the disclosure provides a linear array ultrasonic probe, including:

an array element layer having a number of array elements, one end of each of the array elements being a positive end and the other end thereof being a negative end;

a backing layer having a backing body, with the positive end of the array element arranged on the backing body;

a matching layer arranged on the negative end; and a circuit board having a positive electrode connection circuit and a negative electrode connection circuit, with the positive electrode connection circuit connected to the positive end, and the negative electrode connection circuit connected to the negative end; wherein a first conductive layer is provided on an outer wall of the backing body facing the array element layer, the positive end of the array element is arranged on the first conductive layer, and the positive electrode connection circuit is connected to the positive end via the first conductive layer; and/or a second conductive layer is provided on the negative end of the array element, and the negative electrode connection circuit is connected to the negative end via the second conductive layer;

the first conductive layer is attached to the outer wall of the backing body facing the array element layer, and is integral with the outer wall of the backing body; and/or the second conductive layer is attached to the negative end, and is integral with an end face of the negative end.

One embodiment of the disclosure provides a linear array ultrasonic probe, including:

an array element layer having a number of array elements, one end of each of the array elements being a positive end and the other end thereof being a negative end;

a backing layer having a backing body, with the positive end of the array element arranged on the backing body;

a matching layer arranged on the negative end; and a circuit board having a positive electrode connection circuit and a negative electrode connection circuit, with the positive electrode connection circuit connected to the positive end, and the negative electrode connection circuit connected to the negative end; wherein a first conductive layer is provided on an outer wall of the backing body facing the array element layer, the positive end of the array element is arranged on the first conductive layer, and the positive electrode connection circuit is connected to the positive end via the first conductive layer; and/or a second conductive layer is provided on the negative end of the array element, and the negative electrode connection circuit is connected to the negative end via the second conductive layer; and a thickness a of the first conductive layer is: a≤5 micrometers, and/or a thickness b of the second conductive layer is: b≤5 micrometers.

According to the linear array ultrasonic probe in the foregoing embodiment, a first conductive layer of the linear array ultrasonic probe is arranged on an outer wall of a backing body facing an array element layer by means of a gold spraying, electroplating, or chemical plating process, and/or a second conductive layer is arranged on a negative end by means of a gold spraying, electroplating, or chemical plating process, so that a thickness of at least one of the first conductive layer and the second conductive layer can be made thinner, for example, the thickness a≤5 micrometers. A conductive layer of such a thickness may reduce or even eliminate impact of acoustic impedance caused by the conductive layer, improving performance of the ultrasonic probe.

DESCRIPTION OF THE PREFERRED EMBODIMENTS

Figure 1:
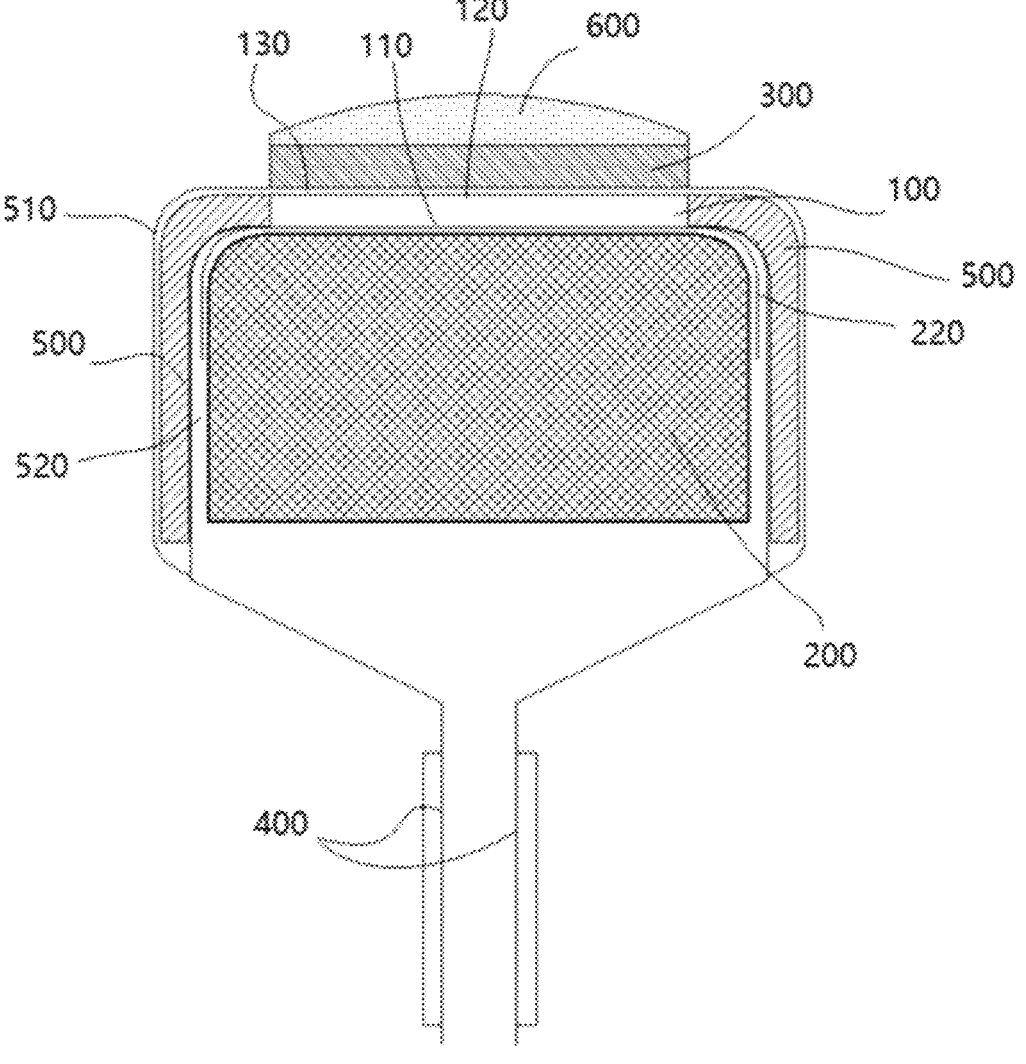
FIG. 1 is a sectional view showing related structures of a linear array ultrasonic probe according to an embodiment of the disclosure.
Figure 2:
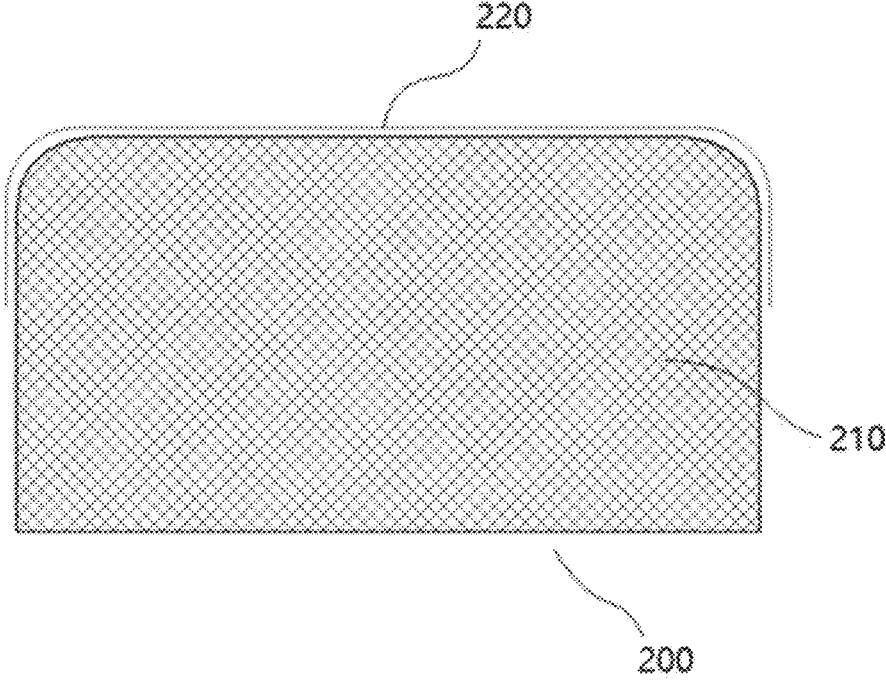
FIG. 2 is a schematic sectional view showing processing a first conductive layer on a backing layer according to an embodiment of the disclosure.

The disclosure will be further described in detail below through specific implementations in conjunction with the accompanying drawings. Associated similar element reference numerals are used for similar elements in different implementations. In the following implementations, many details are described such that the disclosure may be better understood. However, it may be effortlessly appreciated by persons skilled in the art that some of the features may be omitted, or may be substituted by other elements, materials, and methods in different cases. In certain cases, some operations involved in the disclosure are not displayed or described in the specification, which is to prevent a core part of the disclosure from being obscured by too much description. Moreover, for persons skilled in the art, the detailed description of the involved operations is not necessary, and the involved operations can be thoroughly understood according to the description in the specification and general technical knowledge in the art.

In addition, the characteristics, operations, or features described in the specification may be combined in any appropriate manner to form various implementations. Meanwhile, the steps or actions in the method description may also be exchanged or adjusted in order in a way that is obvious to persons skilled in the art. Therefore, the various orders in the specification and the accompanying drawings are merely for the purpose of clear description of a certain embodiment and are not meant to be a necessary order unless it is otherwise stated that a certain order must be followed.

The serial numbers themselves for the components herein, for example, "first" and "second", are merely used to distinguish the described objects, and do not have any sequential or technical meaning. Moreover, as used in the disclosure, "connection" or "coupling", unless otherwise stated, includes both direct and indirect connections (couplings).

An embodiment of the disclosure provides a linear array ultrasonic probe (hereinafter referred to as an ultrasonic probe for short). An array element in the ultrasonic probe presents a new lead-out structure for a positive end and/or a negative end of the array element, especially for high-frequency linear array ultrasonic probes with a probe frequency higher than 8 MHz and ultra-high-frequency linear array ultrasonic probes with a probe frequency higher than 20 MHz.

Referring to FIG. 1 to FIG. 5, the ultrasonic probe includes an array element layer 100, a backing layer 200, a matching layer 300, a circuit board 400, and other related structures. The other related structures may include an acoustic lens 600 and the like. For these structures, reference may be made to structures of an existing ultrasonic probe.

The array element layer 100 is made of a piezoelectric material such as a piezoelectric ceramic. The array element layer 100 is divided into a number of array elements, and these array elements are arranged linearly. One end of each of the array elements is a positive end 110, and the other end thereof is a negative end 120, where the positive end 110 and the negative end 120 are arranged facing each other. In FIG. 1 to FIG. 5, specifically, a lower end of the array element layer 100 is the positive end 110, and an upper end is the negative end 120.

The backing layer 200 has a backing body 210, and the backing body 210 is made of various materials suitable for making the backing layer 200. A first conductive layer 220 is provided on an outer wall of the backing body 210 facing the array element layer 100. The positive end 110 of the array element is arranged on the first conductive layer 220. The first conductive layer 220 is connected to the positive end 110.

A second conductive layer 130 is provided on the negative end 120 of the array element, and the matching layer 300 is arranged on the second conductive layer 130. The circuit board 400 has a positive electrode connection circuit and a negative electrode connection circuit. The positive electrode connection circuit is connected to the first conductive layer 220, and the negative electrode connection circuit is connected to the second conductive layer 130. The circuit board 400 may be a flexible printed circuit board (FPC 400) or a circuit board 400 in another form. The positive electrode connection circuit and the negative electrode connection circuit may be various connection circuits that can be applicable to the first conductive layer 220 and the second conductive layer 130.

A thickness of the conductive layer is closely related to improvement of performance of the ultrasonic probe. A larger thickness brings greater impact of acoustic impedance. Especially, for high-frequency ultrasonic probes and ultra-high-frequency ultrasonic probes, the impact of acoustic impedance is more sensitive to the thickness of the conductive layer.

To reduce or eliminate impact of the thickness of the conductive layer on the performance of the ultrasonic probe, referring to FIG. 1 to FIG. 5, in an embodiment, a thickness a of the first conductive layer 220 is: a≤5 micrometers, and/or a thickness b of the second conductive layer 130 is: b≤5 micrometers. Repeated experiments, analysis, and comparison by the inventors found that, with the conductive layer of such a thickness, the impact of acoustic impedance brought by the conductive layer can be reduced or even eliminated, and performance of the ultrasonic probe can be improved. In particular, when the thickness b of the second conductive layer 130 is less than or equal to 5 micrometers, a propagation effect of an ultrasound wave to a subject will be greatly improved, further improving quality of an ultrasound signal and an imaging effect.

In an embodiment, to make the thickness a≤5 micrometers and the thickness b≤5 micrometers, the first conductive layer 220 is arranged on the outer wall of the backing body 210 facing the array element layer 100 by means of a gold spraying, electroplating, or chemical plating process. In this way, the first conductive layer 220 and the backing body 210 jointly constitute a backing layer 200 that is partially conductive; and/or the second conductive layer 130 is arranged on an end face of the negative end 120 by means of a gold spraying, electroplating, or chemical plating process. With such gold spraying, electroplating, chemical plating, or other processes, a nano-scale or micro-scale bonding layer (namely, the first conductive layer 220 and/or the second conductive layer 130) can be formed on the outer wall of the backing body 210 and/or the end face of the negative end 120. The bonding layer and the backing body 210 or the end face of the negative end 120 are bonded together. With such tight connection, the first conductive layer 220 and/or the second conductive layer 130 may have a relatively small thickness to implement a requirement for electrical conduction, thereby reducing the thickness of the conductive layer. The cost of gold spraying is relatively low, and a relatively uniform thickness of the conductive layer can be better obtained.

Compared with a split-type fabricated structure with the flexible printed circuit board directly connected with the positive end of the array element (that is, the flexible printed circuit board and the positive end of the array element are separately fabricated and then assembled) and/or a split-type fabricated structure of the second conductive layer 130 and the negative end 120 of the array element (that is, the second conductive layer 130 and the negative end 120 of the array element are separately fabricated and then assembled), such an integrally arranged structure can reduce the thickness of the first conductive layer 220 and/or the second conductive layer 130, to make them thinner during fabrication, thereby reducing or eliminating the impact of acoustic impedance brought by the conductive layer.

In an embodiment, both the first conductive layer 220 and the second conductive layer 130 may be made by means of the foregoing gold spraying, electroplating, or chemical plating process. In another embodiment, either the first conductive layer 220 or the second conductive layer 130 may be made by means of the foregoing gold spraying, electroplating, or chemical plating process. For example, when the first conductive layer 220 is made by means of the foregoing processes, the second conductive layer 130 may be an existing structure that can lead out the negative end 120 of the array element. For example, the second conductive layer 130 may be a copper foil or another structure. When the second conductive layer 130 is made by means of the foregoing processes, the first conductive layer 220 may be an existing structure that can lead out the positive end 110 of the array element. For example, the first conductive layer 220 may be various existing lead-out structures of the positive end 110; or the first conductive layer 220 may be omitted, and the circuit board 400 is directly arranged below the positive end 110 of the array element such that the two are directly connected.

In another aspect, the disclosure further provides an embodiment. In this embodiment, the first conductive layer 220 is attached to the outer wall of the backing body 210 facing the array element layer 100, so as to be integral with the outer wall of the backing body 210; and/or the second conductive layer 130 is attached to the end face of the negative end 120, so as to be integral with the end face of the negative end 120.

In addition, the first conductive layer 220 is arranged on the outer wall of the backing body 210 facing the array element layer 100 by means of the gold spraying, electroplating, or chemical plating process, and/or the second conductive layer 130 is arranged on the end face of the negative end 120 by means of the gold spraying, electroplating, or chemical plating process.

This embodiment provides for bonding of the first conductive layer 220 and the backing body 210 and/or bonding of the second conductive layer 130 and the end face of the negative end 120 by means of gold spraying, electroplating, chemical plating, or other processes. Such an integrally arranged structure can reduce the thickness of the first conductive layer 220 and/or the second conductive layer 130, to make them thinner during fabrication, so as to reduce or eliminate the impact of acoustic impedance brought by the conductive layer. Certainly, during fabrication, conductive layers of different thicknesses may also be designed through the integrally arranged structure according to actual needs.

In another aspect, the disclosure further provides an embodiment. In this embodiment, the first conductive layer 220 is attached to the outer wall of the backing body 210 facing the array element layer 100, and is integral with the outer wall of the backing body 210; and/or the second conductive layer 130 is attached to the end face of the negative end 120, and is integral with the end face of the negative end 120.

In addition, in this embodiment, the integrally arranged structure may be implemented by means of processes including, but not limited to, gold spraying, electroplating, and chemical plating, or other means may be used to implement bonding of the first conductive layer 220 and the backing body 210 and/or bonding of the second conductive layer 130 and the end face of the negative end 120.

In an embodiment, the thickness a of the first conductive layer 220 may be: 500 nanometers≤a≤5 micrometers, and/or the thickness b of the second conductive layer 130 may be: 500 nanometers≤a≤5 micrometers. With the conductive layer of such a thickness, the impact of acoustic impedance brought by the conductive layer can be reduced or even eliminated, and performance of the ultrasonic probe can be improved.

Means for implementing the thickness a or b may be, but is not limited to, the foregoing gold spraying, electroplating, chemical plating, or other processes; or the foregoing structure in which the first conductive layer 220 and the backing body 210 are bonded together and/or the second conductive layer 130 and the end face of the negative end 120 are bonded together may be used without imposing a limitation.

Generally, the positive ends 110 of the array elements are separated from each other. For example, the positive end 110 of the piezoelectric material may be cut into a number of units. The negative ends 120 of the array elements are separated from each other. For example, during cutting of the positive end 110, the piezoelectric material may be directly cut into a number of separate units. Alternatively, in some embodiments, the negative end 120 of the piezoelectric material may be kept connected, that is, all the negative ends 120 are connected together, and only the positive end 110 is cut and separated.

To be connected with respective positive ends 110, the first conductive layer 220 is divided into a number of conductive units, and each of the conductive units is correspondingly connected to a positive end 110 of one of the array elements. The conductive units are connected to the positive electrode connection circuits, respectively, so as to deliver an excitation electrical pulse signal from the ultrasound machine to each active positive end 110.

Cutting of the first conductive layer 220 may be performed along with cutting of the positive end 110 of the array element. For example, in an embodiment, the first conductive layer 220 of a large area is first arranged on the backing body 210, then the piezoelectric material is mounted onto the first conductive layer 220, and then the piezoelectric material is cut along with the first conductive layer 220, to form a number of separate units. Each independent unit in the piezoelectric material is an array element, and each independent unit in the first conductive layer 220 is a conductive unit.

The negative ends 120 of the array elements are not necessarily led out one by one, and therefore the second conductive layer 130 may be an integral structure. Certainly, when necessary, the second conductive layer 130 may alternatively be arranged as a number of units.

Referring to FIG. 1 to FIG. 5, the first conductive layer 220 extends from the front of the backing body 210 facing the array element layer 100 to at least one side of the backing body 210, until it extends to the side of the backing body 210, so as to be connected to the circuit board 400. As shown, the first conductive layer 220 protrudes from the two opposite sides of the backing body 210. In addition, in other embodiments, the first conductive layer 220 may be provided only on the front of the backing body 210 facing the array element layer 100.

Further, referring to FIG. 1 to FIG. 5, in the foregoing embodiments, insulators 500 may be further included. The insulators 500 are provided on at least one side of the array element layer 100. The insulator 500 may be made of various insulating materials, such as resin. A third conductive layer 510 is attached to an outer wall of the insulator 500. The third conductive layer 510 may be arranged on the outer wall of the insulator 500 by means of, without limited to, gold spraying, electroplating, chemical plating, or other processes.

The second conductive layer 130 is connected to the third conductive layer 510, and the negative electrode connection circuit may be connected to the negative end 120 via the third conductive layer 510 and the second conductive layer 130.

In an embodiment, a thickness c of the third conductive layer 510 may be: 500 nanometers≤c≤5 micrometers.

The insulator 500 may be a pre-fabricated component and is assembled to the backing layer 200. Alternatively, the insulator 500 may be prepared by processing directly on the side of the array element layer 100 and a surface of the first conductive layer 220 after the first conductive layer 220 and the array element layer 100 have been arranged. For example, the insulators 500 are formed on sides of the first conductive layer 220 and the array element layer 100 by means of spraying, coating, or the like. The insulators 500 insulate the second conductive layer 130 and the third conductive layer 510 from the first conductive layer 220 to avoid short circuits.

Further, referring to FIG. 1 to FIG. 5, in an embodiment, the third conductive layer 510 is integral with the second conductive layer 130, i.e., and the third conductive layer 510 are the same conductive layer integrally arranged and attached to the end face of the negative end 120 and the outer wall of the insulator 500. To be specific, the second conductive layer 130 and the third conductive layer 510 may be fabricated on the end face of the negative end 120 and the outer wall of the insulator 500 by performing one process, and the two are bonded together.

In an embodiment, the insulator 500 may be aligned with the array element layer 100, so as to ensure the continuity of the second conductive layer 130 and the third conductive layer 510 during one processing, so that the conductive performance is more stable. Certainly, in other embodiments, the connection between the insulator 500 and the array element layer 100 may also be curved or stepped.

Certainly, in other embodiments, alternatively, the second conductive layer 130 may be fabricated on the end face of the negative end 120, the third conductive layer 510 may be fabricated on the outer wall of the insulator 500, and then the third conductive layer 510 and the second conductive layer 130 are assembled and connected to the negative end 120.

Figure 3:
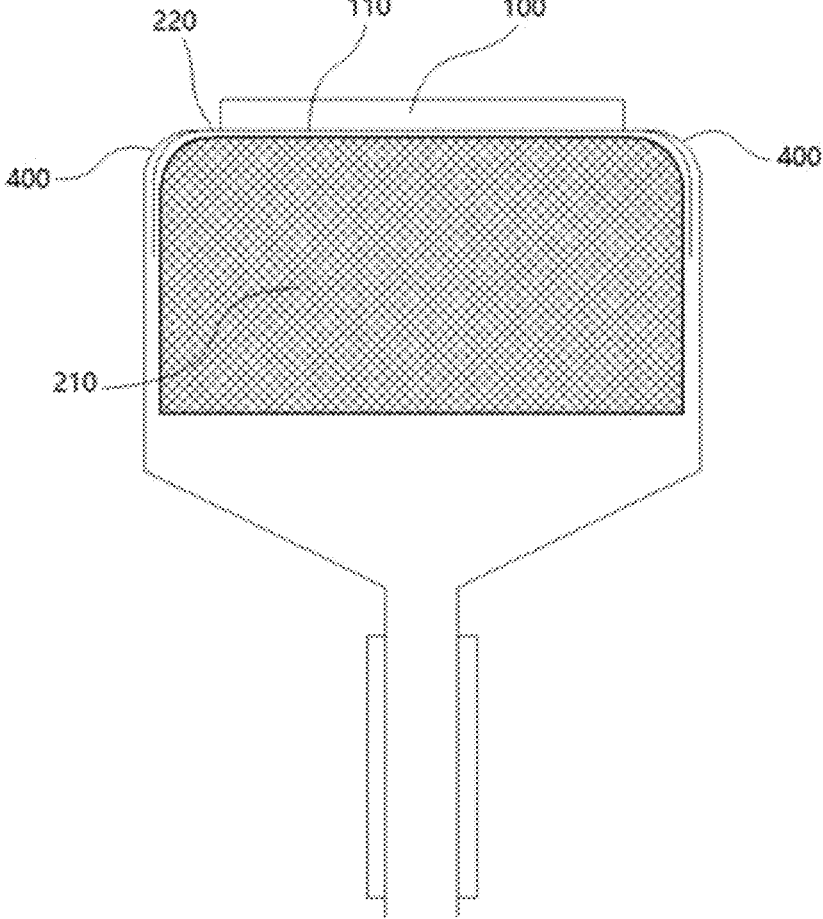
FIG. 3 is a schematic sectional view showing arranging an array element layer on a first conductive layer according to an embodiment of the disclosure.
Figure 4:
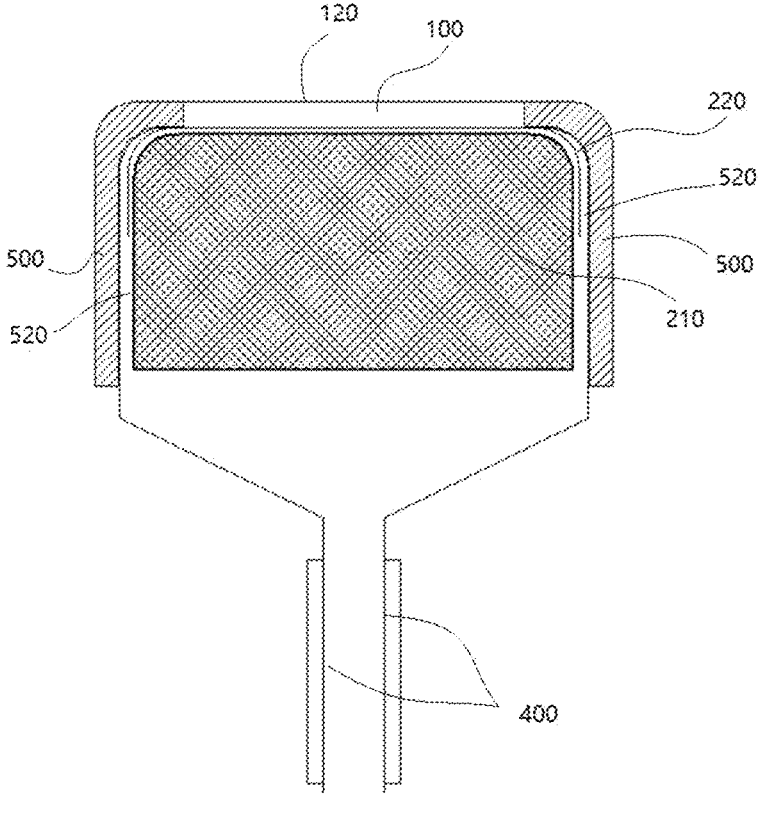
FIG. 4 is a schematic sectional view showing adding an insulator on either side of an array element layer according to an embodiment of the disclosure.

Further, referring to FIG. 1 to FIG. 5, in an embodiment, the insulator 500 is on a side of the backing layer 200, a gap 520 is present between the insulator 500 and the backing layer 200, and the first conductive layer 220 extends into the gap 520, so that the second conductive layer 130 and the third conductive layer 510 are better insulated from the first conductive layer 220 to avoid short circuits. The insulator 500 can also protect the first conductive layer 220. Referring to FIG. 4, the circuit board 400 may extend into the gap 520, and a connection end of the positive electrode connection circuit may be provided in the gap 520. Therefore, with the insulator 500, a connection effect between the positive electrode connection circuit and the first conductive layer 220 can be also ensured, to prevent a connection position between the positive electrode connection circuit and the first conductive layer 220 from being damaged by another component during assembly and use of the ultrasonic probe, improving stability of the positive end 110.

Figure 5:
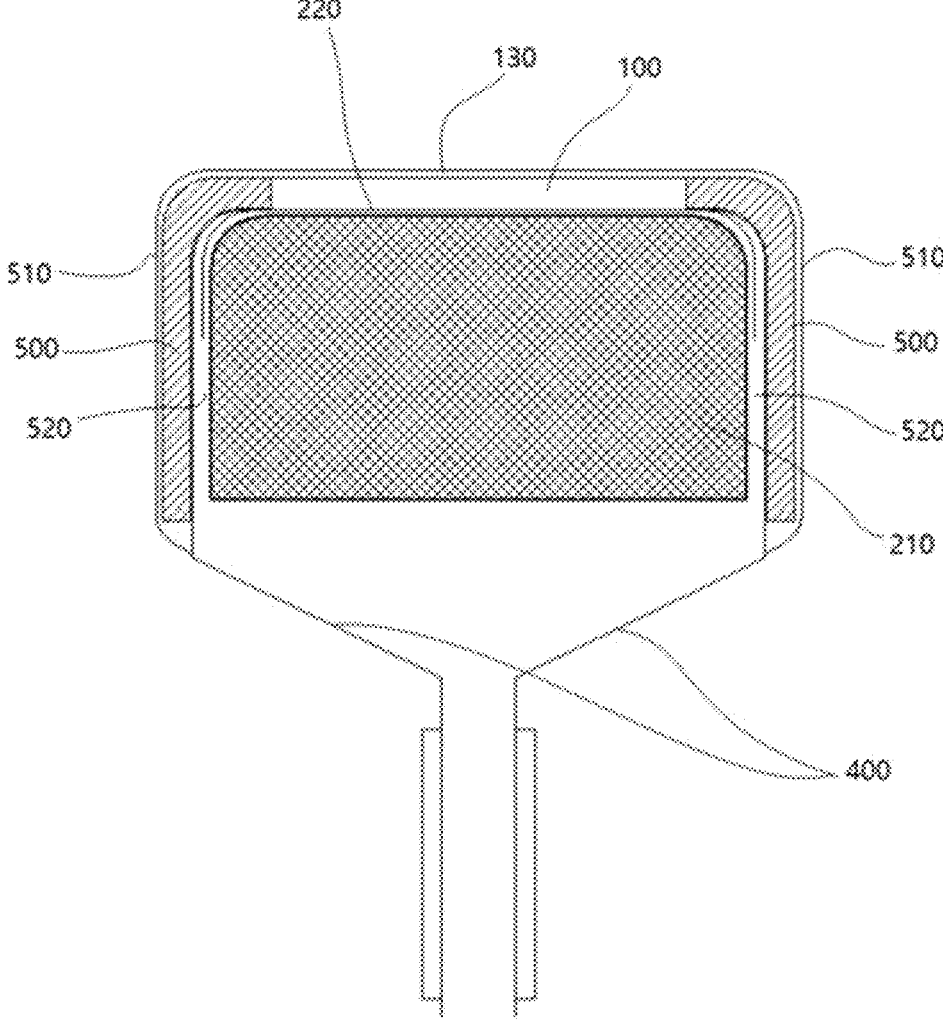
FIG. 5 is a schematic sectional view showing processing a second conductive layer on a negative end of an array element layer and an insulator according to an embodiment of the disclosure.

Further, referring to FIG. 1, FIG. 3, and FIG. 5, in an embodiment, there are at least two insulators 500, which are distributed facing each other on two opposite sides of the array element layer 100 and the backing layer 200. The insulators 500 further form a gap 520 on the two opposite sides of the backing body 210 to accommodate the first conductive layer 220 and the circuit board 400.

In the embodiments shown in FIG. 3 and FIG. 4, the circuit board 400 is provided below the backing layer 200, and the two ends of the circuit board are inserted into the gap 520 between the insulator 500 and the backing layer 200, so as to be connected to the corresponding first conductive layer 220.

In an embodiment, referring to FIG. 5, the third conductive layer 510 on the insulator 500 extends from the outer wall of the insulator 500 to the circuit board 400, so as to be connected to the negative electrode connection circuit of the circuit board 400.

The disclosure has been described by using specific examples above, which are merely for the purpose of facilitating understanding of the disclosure and are not intended to limit the disclosure. For persons skilled in the technical field to which the disclosure pertains, several simple deductions, variations, or replacements may also be made according to the idea of the disclosure.

What is claimed is:

1. A linear array ultrasonic probe, comprising:

an array element layer having a plurality of array elements, each of the array elements comprising a positive end and a negative end;

a backing layer having a backing body, with the positive end of the array element arranged on the backing body;

a matching layer arranged on the negative end; and a circuit board having a positive electrode connection circuit and a negative electrode connection circuit, the positive electrode connection circuit connected to the positive end, and the negative electrode connection circuit connected to the negative end;

wherein a first conductive layer is provided on an outer wall of the backing body facing the array element layer, the positive end of the array element is arranged on the first conductive layer, and the positive electrode connection circuit is connected to the positive end via the first conductive layer; and a second conductive layer is provided on the negative end of the array element, and the negative electrode connection circuit is connected to the negative end via the second conductive layer;

a thickness of the first conductive layer is less than or equal to 5 micrometers, and/or a thickness of the second conductive layer is less than or equal to 5 micrometers; and the first conductive layer is arranged on the outer wall of the backing body facing the array element layer by a gold spraying, electroplating, or chemical plating process; and/or the second conductive layer is arranged on the negative end by a gold spraying, electroplating, or chemical plating process, wherein the linear array ultrasonic probe further comprises an insulator provided on at least one side of the array element layer, a third conductive layer is arranged on an outer wall of the insulator and extends from the outer wall of the insulator to the circuit board, the second conductive layer is connected to the third conductive layer so as to be connected to the negative electrode connection circuit of the circuit board via the third conductive layer, and the insulator insulates the second conductive layer and the third conductive layer from the first conductive layer.

2. The linear array ultrasonic probe of claim 1, wherein, the first conductive layer is attached to the outer wall of the backing body facing the array element layer so as to be integral with the outer wall of the backing body; and/or the second conductive layer is attached to the negative end so as to be integral with the negative end.

3. The linear array ultrasonic probe of claim 1, wherein the third conductive layer is arranged on the outer wall of the insulator by a gold spraying, electroplating, or chemical plating process.

4. The linear array ultrasonic probe of claim 3, wherein the third conductive layer is integral with the second conductive layer.

5. The linear array ultrasonic probe of claim 3, wherein the insulator is arranged on a side of the backing layer, a gap is present between the insulator and the backing layer, and the first conductive layer extends into the gap.

6. The linear array ultrasonic probe of claim 3, wherein at least two insulators are distributed facing each other on two opposite sides of the array element layer and the backing layer.

7. The linear array ultrasonic probe of claim 1, wherein, the positive ends of the array elements are separated from each other, the negative ends of the array elements are separated from each other or connected together, the first conductive layer is divided into a plurality of conductive units, each of the conductive units is correspondingly connected to a positive end of one of the array elements, and the conductive units are all connected to the positive electrode connection circuit.

8. The linear array ultrasonic probe of claim 1, wherein the linear array ultrasonic probe is a high-frequency linear array ultrasonic probe with a probe frequency higher than 8 MHz or an ultra-high-frequency linear array ultrasonic probe with a probe frequency higher than 20 MHz.

9. A linear array ultrasonic probe, comprising:

an array element layer having a plurality of array elements, each of the array elements comprising a positive end and a negative end;

a backing layer having a backing body, with the positive end of the array element arranged on the backing body;

a matching layer arranged on the negative end; and a circuit board having a positive electrode connection circuit and a negative electrode connection circuit, the positive electrode connection circuit connected to the positive end, and the negative electrode connection circuit connected to the negative end; wherein a first conductive layer is provided on an outer wall of the backing body facing the array element layer, the positive end of the array element is arranged on the first conductive layer, and the positive electrode connection circuit is connected to the positive end via the first conductive layer; and a second conductive layer is provided on the negative end of the array element, and the negative electrode connection circuit is connected to the negative end via the second conductive layer;

the first conductive layer is attached to the outer wall of the backing body facing the array element layer so as to be integral with the outer wall of the backing body; and/or the second conductive layer is attached to the negative end so as to be integral with the negative end; and wherein the first conductive layer is arranged on the outer wall of the backing body facing the array element layer by a gold spraying, electroplating, or chemical plating process; and/or the second conductive layer is arranged on the negative end by a gold spraying, electroplating, or chemical plating process, wherein the linear array ultrasonic probe further comprises an insulator provided on at least one side of the array element layer, a third conductive layer is arranged on an outer wall of the insulator and extends from the outer wall of the insulator to the circuit board, the second conductive layer is connected to the third conductive layer so as to be connected to the negative electrode connection circuit of the circuit board via the third conductive layer, and the insulator insulates the second conductive layer and the third conductive layer from the first conductive layer.

10. The linear array ultrasonic probe of claim 9, wherein, the third conductive layer is attached to the outer wall of the insulator, and the third conductive layer is attached to the outer wall of the insulator by a gold spraying, electroplating, or chemical plating process.

11. The linear array ultrasonic probe of claim 10, wherein the third conductive layer is integral with the second conductive layer.

12. The linear array ultrasonic probe of claim 10, wherein, the insulator is arranged on a side of the backing layer, a gap is present between the insulator and the backing layer, and the first conductive layer extends into the gap.

13. The linear array ultrasonic probe of claim 10, wherein at least two insulators, are distributed facing each other on two opposite sides of the array element layer and the backing layer.

14. The linear array ultrasonic probe of claim 9, wherein, a thickness of the first conductive layer is greater than or equal to 500 nanometers and less than or equal to 5 micrometers, and a thickness of the second conductive layer is greater than or equal to 500 nanometers and less than or equal to 5 micrometers.

15. The linear array ultrasonic probe of claim 10, wherein a thickness of the third conductive layer is greater than or equal to 500 nanometers and less than or equal to 5 micrometers.

16. The linear array ultrasonic probe of claim 9, wherein, the positive ends of the array elements are separated from each other, the negative ends of the array elements are separated from each other or connected together, the first conductive layer is divided into a plurality of conductive units, and each of the conductive units is correspondingly connected to a positive end of one of the array elements.

17. The linear array ultrasonic probe of claim 9, wherein the linear array ultrasonic probe is a high-frequency linear array ultrasonic probe with a probe frequency higher than 8 MHz or an ultra-high-frequency linear array ultrasonic probe with a probe frequency higher than 20 MHz.

18. A linear array ultrasonic probe, comprising:

an array element layer having a plurality of array elements, each of the array elements comprising a positive end and a negative end;

a backing layer having a backing body, with the positive end of the array element arranged on the backing body;

a matching layer arranged on the negative end; and a circuit board having a positive electrode connection circuit and a negative electrode connection circuit, the positive electrode connection circuit connected to the positive end, and the negative electrode connection circuit connected to the negative end; wherein a first conductive layer is provided on an outer wall of the backing body facing the array element layer, the positive end of the array element is arranged on the first conductive layer, and the positive electrode connection circuit is connected to the positive end via the first conductive layer; and a second conductive layer is provided on the negative end of the array element, and the negative electrode connection circuit is connected to the negative end via the second conductive layer;

the first conductive layer is attached to the outer wall of the backing body facing the array element layer and is integral with the outer wall of the backing body; and/or the second conductive layer is attached to the negative end and is integral with an end face of the negative end, wherein the linear array ultrasonic probe further comprises an insulator provided on at least one side of the array element layer, a third conductive layer is arranged on an outer wall of the insulator and extends from the outer wall of the insulator to the circuit board, the second conductive layer is connected to the third conductive layer so as to be connected to the negative electrode connection circuit of the circuit board via the third conductive layer, and the insulator insulates the second conductive layer and the third conductive layer from the first conductive layer.

19. The linear array ultrasonic probe of claim 18, wherein, the third conductive layer is attached to the outer wall of the insulator.

20. The linear array ultrasonic probe of claim 18, wherein, a thickness of the first conductive layer is greater than or equal to 500 nanometers and less than or equal to 5 micrometers, and a thickness of the second conductive layer is greater than or equal to 500 nanometers and less than or equal to 5 micrometers.

* * * * *